Aug. 29, 1967  G. W. JACKSON  3,338,633
LATCHING AND HINGING ASSEMBLY FOR FOLDING SEAT
Filed May 31, 1966  4 Sheets-Sheet 1
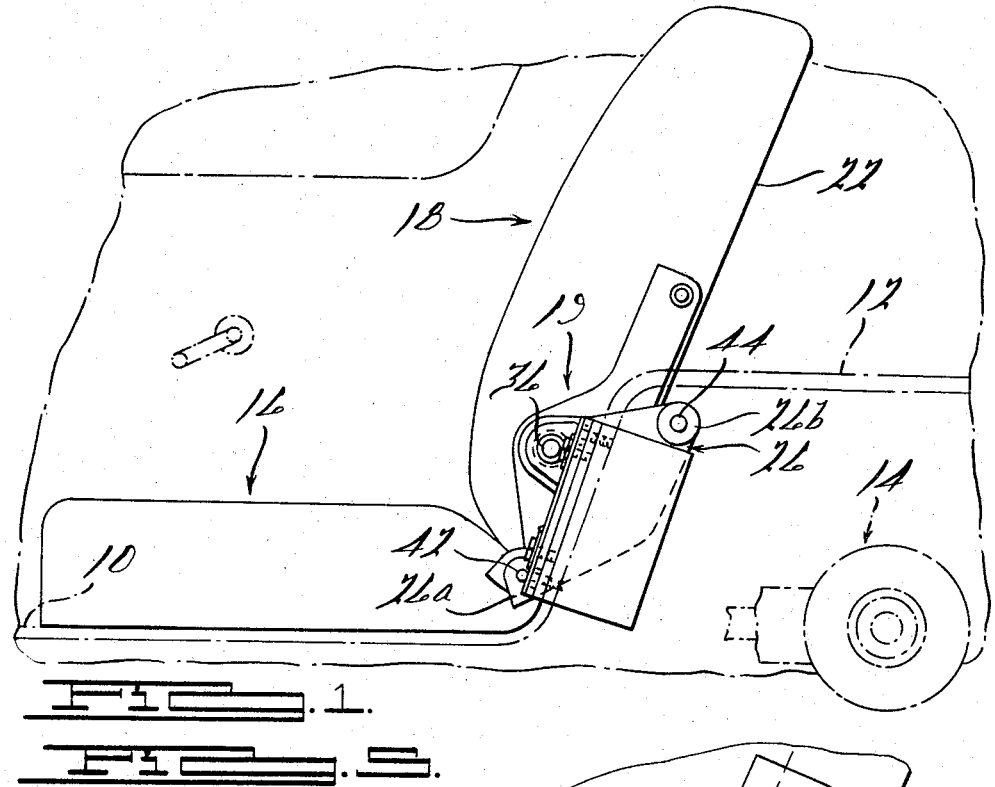
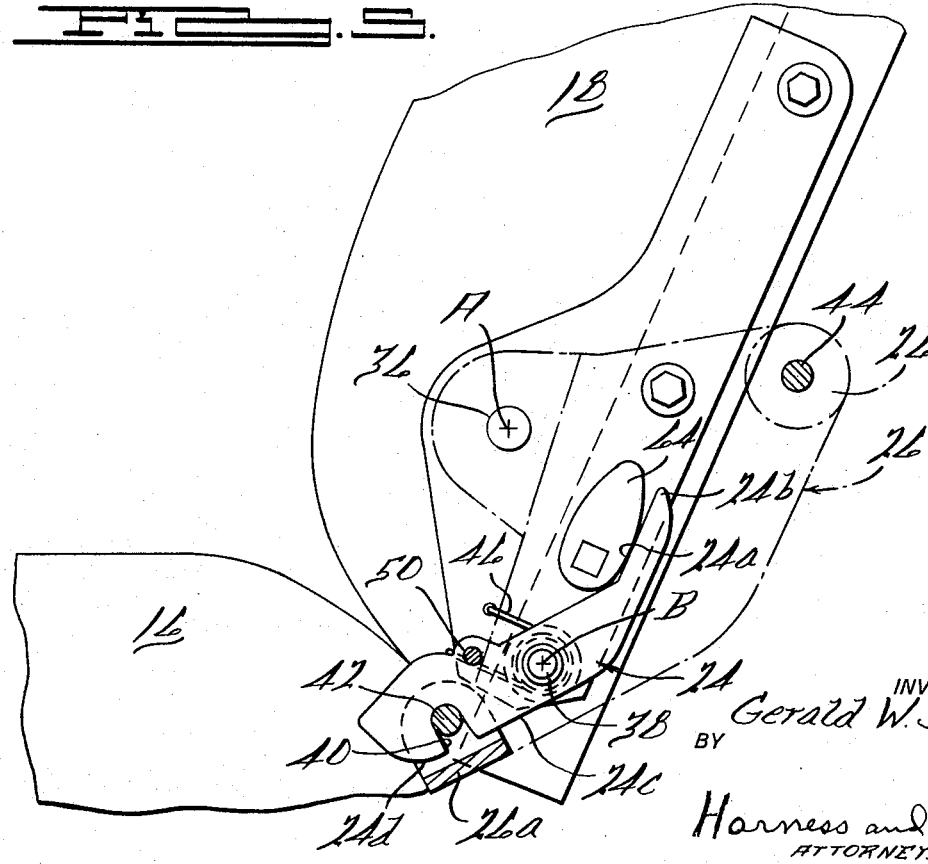
INVENTOR.
Gerald W. Jackson
BY
Harness and Harris
ATTORNEYS.

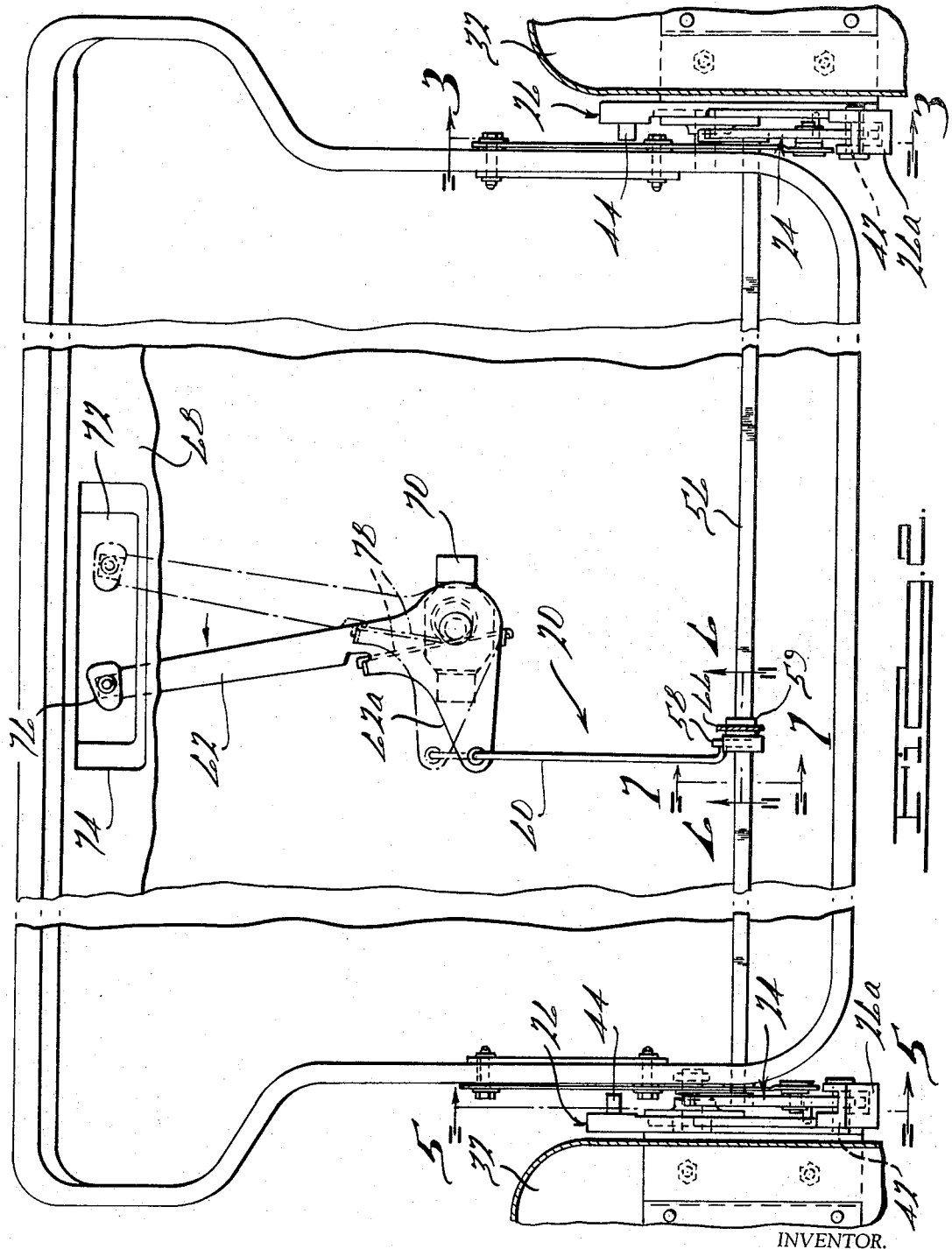

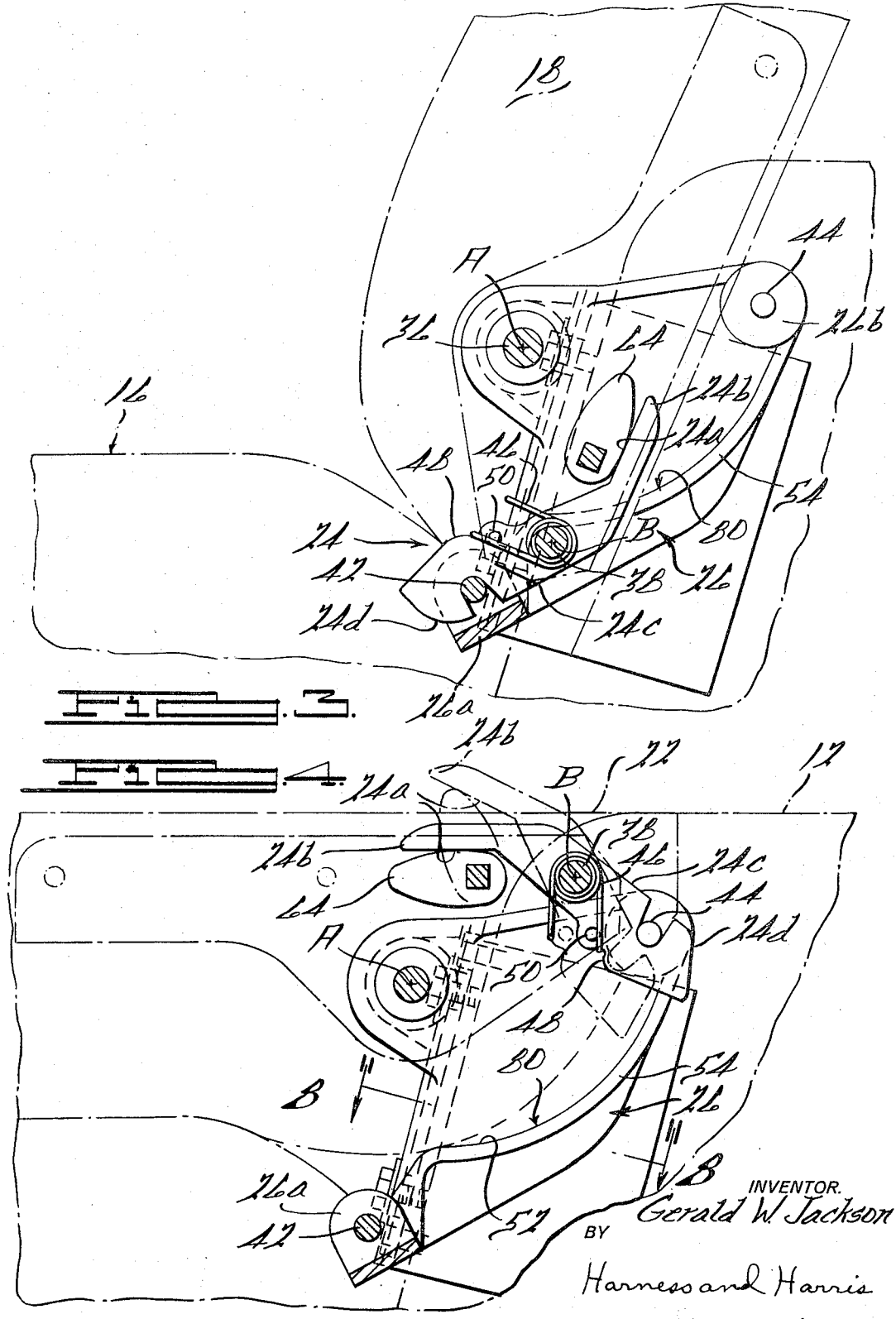

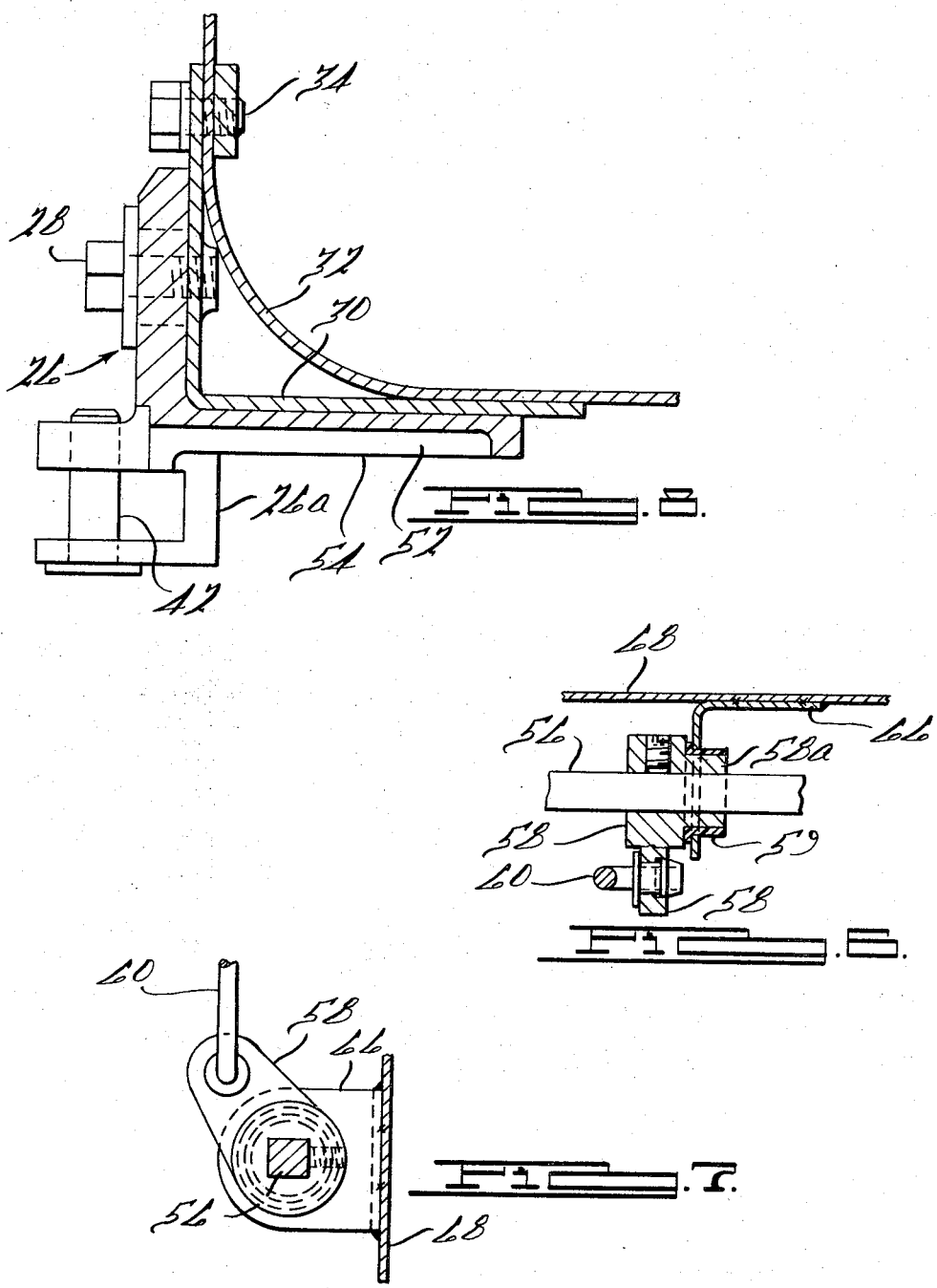

United States Patent Office 3,338,633
Patented Aug. 29, 1967

3,338,633
LATCHING AND HINGING ASSEMBLY FOR FOLDING SEAT
Gerald W. Jackson, Dearborn, Mich., assignor to Chrysler Corporation, Highland Park, Mich., a corporation of Delaware
Filed May 31, 1966, Ser. No. 554,167
8 Claims. (Cl. 297—379)

This invention relates to folding seat assemblies. More particularly it relates to a folding seat assembly for a utility or multi-purpose automobile.

In a folding seat assembly for an automobile it is necessary to provide means to hinge the seat back for its pivotal movement between seating and folded positions. It is also necessary to provide means to securely latch the seat back to each of its positions, as well as means to release the latching mechanism in each position to allow the seat back to be removed to its other position.

Various forms of latching and hinging assemblies have been proposed for use with automobile folding seats. In each of these proposals, however, the latching or hinging elements are exposed in the folded and/or seating position of the seat back. Exposure of the hinging or latching elements is objectionable in several important respects. Firstly, the exposed latching or hinging elements create a safety hazard. Secondly, they interrupt the otherwise clear loading space available with the seat back in the folded position, thereby interfering with loading and potentially damaging the cargo. Thirdly, they impart a cluttered and aesthetically displeasing appearance to the cargo area.

Each of the prior latching and hinging proposals is also relatively complex and therefore expensive, both from the standpoint of high cost of parts as well as from the standpoint of high cost of labor for assembly.

Certain of the prior latching and hinging proposals are also rather difficult to operate, requiring a dexterity and/or strength beyond the ability of many motor vehicle operators.

Accordingly, it is an object of the present invention to provide an improved latching and hinging assembly for a folding seat.

It is a more particular object to provide an improved latching and hinging assembly for a folding seat in a utility or multi-purpose automobile.

Another object is to provide a latching and hinging assembly as aforesaid which is simple in design and inexpensive in construction.

Yet another object is to provide a latching and hinging assembly as aforesaid in which neither the latching nor the hinging elements are exposed in either the folded or the seating position of the seat back.

Still another object is to provide a latching and hinging assembly as aforesaid which is extremely easy to operate, requiring neither unique dexterity nor exceptional strength.

The latching and hinging assembly of the invention, broadly considered, comprises an arm member mounted on the seat back for pivotal movement about a generally horizontal axis spaced from but generally adjacent the seat back hinge axis, means defining a hook portion on one end of the arm member remote from its pivot axis, and a pair of spaced stop members adapted to selectively coact with the hook portion of the arm member to latch the seat back in its upright and folded positions. The first stop member is disposed in the arcuate path of the hook portion of the arm member with the seat back in its upright position so that, as the seat back reaches its upright position, the arm member may be swung about its own axis to bring the hook portion into latching engagement with the first stop member. The second stop member is disposed in the arcuate path of the hook portion of the arm member with the seat back in its folded position so that, as the seat back reaches its folded position, the arm member may be swung about its own axis to bring the hook portion into latching engagement with the second stop member.

In the disclosed embodiment of the invention, the hook portion of the arm member is defined by an open ended slot in the arm extending generally transversely of the arm member and normal to the arm member axis, and each stop member comprises a fixed pin extending generally parallel to the arm member axis and adapted to be received within the slot in the arm member in response to swinging movement of the latter about its own axis.

Spring means are also provided to continuously bias the arm member for rotation in a direction to allow the stop pins to enter the open side of the slot in the arm member, and manually operable handle means are provided to rotate the arm member in the opposite direction against the bias of the spring means. The spring means thus function, upon arrival of the seat back at one of its terminal positions, to rotate the arm member and pass the slot over the corresponding stop pin to lock the seat back in that position whereafter, when it is desired to remove the seat back to its other terminal position, the handle means may be actuated to rotate the arm member away from the stop pin and release the seat back for movement to its other position.

These and other objects, features and advantages of the invention will be apparent from the following detailed description of a preferred embodiment of the invention and from the accompanying drawings wherein:

FIG. 1 is an end elevational view of a folding seat assembly for an automobile embodying a latching and hinging assembly according to the invention;

FIG. 2 is a rear elevational view of the seat assembly of FIG. 1;

FIG. 3 is a cross sectional view taken on line 3—3 of FIG. 2 and showing the relative disposition of the various elements of the latching and hinging assembly with the seat back in its upright or seating positions;

FIG. 4 is a view similar to FIG. 3 showing the relative disposition of the various elements of the latching and hinging assembly with the seat back in its folded or cargo carrying position;

FIGS. 5, 6 and 7 are cross sectional views taken on lines 5—5, 6—6, and 7—7, respectively, of FIG. 2; and FIG. 8 is a cross sectional view taken on line 8—8 of FIG. 4.

The folding seat assembly of the invention is shown in FIG. 1 as the rear seat of an automobile. The body of the automobile appears fragmentarily in phantom in FIG. 1 and includes a rear floor portion 10 and a cargo floor portion 12 elevated above the level of floor portion 10 to provide clearance for the rear axle assembly 14.

The seat assembly includes a seat bottom 16 supported on floor portion 10, a seat back 18, left and right hinging and latching assemblies 19, and a release assembly 20 (FIG. 2).

Hinging and latching assemblies 19 mount seat back 18 for pivotal movement between the upright or seating position of FIGS. 1, 3 and 5 and the folded position of FIG. 4 in which it overlies seat bottom 16 with its back surface 22 generally flush with cargo floor portion 12 to form therewith a continuous cargo floor; assemblies 19 also serve to latch the seat back in either of its positions. Release assembly 20 serves to release the seat back in each position for movement to its other position. Left hinging and latching assembly 19 is identical to right assembly 19 except for hand. Left assembly 19 appears in FIGS. 1 and 5 and right assembly 19 appears in FIGS. 3, 4 and 8.

Each assembly 19 comprises an arm member 24 and a fixed member 26.

As best seen in FIG. 8, the fixed member 26 of each assembly is in the form of an angle bracket fixed as by screws 28 to an angular mounting bracket 30. Mounting bracket 30 is in turn secured to the related wheel housing 32 as by bolts 34. Referring now particularly to FIGS. 3–5, each bracket 26 carries a hinge pin 36 projecting laterally inward from the side face of the bracket and journaled in the adjacent side face of seat back 18. Pins 36 thus mount seat back 18 for pivotal movement about the horizontal axis A of the pins.

Each arm member 24 is mounted intermediate its ends on a stub pin 38 projecting laterally from a respective side face of seat back 18; pins 38 thus mount arm members 24 for pivotal movement relative to the seat back about a pivot axis B which is spaced from seat back axis A.

Each arm member 24 includes a hook portion in the form of a slot 40 adjacent one end of the arm member. Slots 40 extend in a direction generally transverse of the respective arm members and generally normal to the arm member axis B. Each slot 40 opens at one side edge of the related arm member so as to be capable of selectively receiving one or the other of a pair of spaced stop members 42, 44.

Stop members 42, 44 are in the form of pins carried by bracket 26 and extending generally parallel to axes A and B. Lower pin 42 is carried by a clevis portion 26a of bracket 26 and upper pin 44 projects laterally from a boss portion 26b of bracket 30. Lower pin or stop member 42 lies in the arcuate path of slot 40 with seat back 18 in its upright or seating position. Upper pin or stop member 44 lies in the arcuate path of slot 40 with seat back 18 in its folded or cargo carrying position.

Thus, with seat back 18 in its upright position, as seen in FIGS. 3 or 5, arm member 24 may be rotated counterclockwise about its axis B to pass slot 40 over pin 42 and thereby lock the seat back in its upright position. Conversely, with seat back 18 in its cargo carrying position, as seen in FIG. 4, arm member 24 may be rotated counterclockwise about axis B to pass slot 40 over pin 42 and thereby lock the seat back in its folded position.

A coil spring 46 is wound around each stub pin 38. One end of each spring 46 is anchored to seat back 18 and the other end is received in a notch 48 in the related arm member 24. Springs 46 thus continuously bias arm member 24 for counterclockwise rotation about axis B.

The edge of each arm member into which the slot 40 opens is shaped to define a straight guide surface 24c extending rearwardly (as seen in FIG. 3) from slot 40 and a curved nose surface 24d extending forwardly from slot 40. The end of each arm member remote from slot 40 includes a canted tail portion 24b defining a straight guide surface 24a at one face thereof. Each arm member 24 further carries a stub pin 50 projecting laterally inwardly from the arm member for coaction with an elongated, curvilinear ramp or guide surface 52 defined as a portion of the upper face of a curvilinear strengthening rib 54 formed as an integral portion of the related angle bracket 26. Each rib 54 extends from the clevis portion 26b of the related bracket to the boss portion 26b of that bracket.

Release assembly 20 is best seen in FIGS. 2, 6 and 7. It includes a shaft 56, a crank arm 58, a rod 60, and a handle member 62.

Shaft 56 is rectangular in cross section and extends the full width of seat back 18. Shaft 52 passes at its opposite ends through the respective side faces of seat back 18. An eccentric 64 (FIGS. 3–5) is secured to each end of shaft 18 and each eccentric engages the end of the related arm member 24 remote from slot 40.

Crank arm 58 is keyed to shaft 56 intermediate the ends of the latter. Arm 58 includes a trunnion portion 58a which is journaled in a bushing 59 carried by an angle bracket 66 suitably secured to the inner face of back plate 68 of seat back 18.

Handle member 62 is pivotally mounted at its lower end on a bracket 70 suitably secured to back plate 68. The upper end of handle member 62 projects into a recess 72 defined by a concave housing member 74 suitably embedded in the upper rear face of the seat back. Recess 72 opens at the rear face of the seat back to allow access to a knob 76 secured to the upper end of handle member 62.

Rod 38 is pivotally secured at its lower end to the free end of crank arm 58 and at its upper end to the free end of an eccentric portion 62a of handle member 62. A coil spring 78 continuously biases handle member 62 for counterclockwise rotation, as viewed in FIG. 2, about its pivotal mounting axis.

Operation

When the seat back is in its upright or seating position, handle member 62 is in the solid line position of FIG. 2 and pins 42 are seated in the respective slots 40 of arm members 24. Movement of the seat back in either direction is now prevented by the engagement of pins 42 with one or the other of the side walls of slots 40. When it is desired to move the seat back to its folded position, knob 76 is grasped to move handle member 62 counterclockwise, against the resistance of spring 78, to its dotted line position of FIG. 2. This raises rod 60 and pivots shaft 52, and thereby eccentrics 64, clockwise. As eccentrics 64 rotate clockwise, they engage the surfaces 24a on the respective arm members. Continued clockwise rotation of eccentrics 64 rotates arm members 24 clockwise about axis B to move slots 40 upwardly out of engagement with pins 42. Seat back 18 may now be pivoted forward slightly to bring guide pins 50 into a position overlying the lower ends of guide surfaces 52, whereafter handle member 62 may be released and allowed to return to its solid line position under the urging of spring 78. As the forward pivotal movement of seat back 18 is continued, guide pins 50 slide along guide surfaces 52 and rotate arm members 24 counterclockwise relative to seat back 18 to allow the tip or tail ends 24b of the arm members to clear upper stop pins 44. As the guide pins 50 reach a point 80 on the respective guide surfaces 52, surfaces 24a move into engagement with eccentrics 64 to preclude further counterclockwise rotation of arm member 24 relatvie to seat back 18. As the forward pivotal movement of the seat back continues, pins 50 leaves surfaces 52 and arm members 24 move with the seat back about axis A. As the seat back approaches its folded position, straight surface 24c on each arm member strikes the related pin 44 and thereafter slides along that pin to rotate arm members 24 clockwise relative to seat back 18 and thereby move tip ends 24b away from the eccentrics 64. As slots 40 reach pins 44, springs 46 unwind to rotate arm member 24 counterclockwise about axis B and move slots 40 over pins 44. Movement of the seat back in either direction is now prevented by engagement of pins 44 with one or the other of the side walls of slots 40.

When it is again desired to move the seat back to its seating position, handle member 62 is again moved counterclockwise to its dotted line position. This rotates eccentrics 64 clockwise and moves arm members 24 from their solid line, latched position of FIG. 4 to their dotted line position of FIG. 4 in which they clear pins 44. Seat back 18 may now be lifted up slightly to move surfaces 24c into sliding contact with pins 44, whereafter handle member 62 may be released and allowed to return to its solid line position under the urging of spring 78. As the upward pivotal movement of the seat back is continued, pins 44 slide along surfaces 24c and arm members 24 are rotated counterclockwise relative to the seat back by springs 46. This counterclockwise rotation of arm members 24 continues until surfaces 24c butt against eccentrics 64, whereafter arm members 24 rotate with the seat back until pins 50 strike guide surfaces 52 at the points 80. Pins 50 and guide surfaces 52 now coact, with continued movement of seat back 18, to rotate arm members 24 clockwise relative to seat back 18 to allow the forward tips of arm members 24 to pass above pins 42. As pins 50 ride off of surfaces 52, curved nose surfaces 24d engage the tops of pins 42; surfaces 24d thereafter ride along pins 42 to bring slots 40 over the pins, whereafter springs 46 unwind to rotate arm members 24 counterclockwise about axis B and pass slots 40 over pins 42.

The latching and hinging arrangement of the invention will be seen to provide several important advantages. Since the latching and hinging elements are all grouped around the lower edge of the seat back, they are substantially inaccessible and out of sight in either the seating or folded positions of the seat back.

Because of their inaccessible positions, they are not likely to injure occupants, either during the course of normal usage of the vehicle or under emergency or collision conditions. They are also not likely to injure or snag cargo, nor interfere with the loading or unloading of cargo. The out-of-sight disposition of all of the hinging and latching elements also imparts a clean and aesthetically pleasing appearance to the cargo area. The latching and hinging arrangement of the invention is also extremely easy to operate, and yet provides a positive latching action in either position of the seat back. The described latching and hinging construction is also relatively simple and inexpensive.

The described latching and hinging arrangement also allows for considerable manufacturing and assembly tolerances since each latching assembly 19 operates independently of the other and independently of the releasing mechanism 20. That is, since there is no rigid interconnection between the latching assemblies 19 and the release assembly 20 but rather a camming connection allowing lost motion or play between the two assemblies, the arms 24 of the individual latching assemblies 19 may each seek their latching positions independently of the movement of the other arm 24, thereby allowing each arm member to firmly latch even in the case of substantial misalignment between the left and right latching assemblies resulting from an adverse tolerance stackup.

Although a preferred embodiment of the invention has been illustrated and described in detail, it will be understood that various changes and modifications may be made in the preferred embodiment without departing from the scope or spirit of the invention as defined in the appended claims.

I claim:
1. A folding seat assembly comprising
 (A) a seat bottom;
 (B) a seat back mounted for pivotal movement relative to said seat bottom about a generally horizontal axis between angularly spaced first and second positions;
 (C) an arm member mounted on said seat back at one side of the latter for pivotal movement about a generally horizontal axis spaced from said seat back axis, said arm member including a hook portion spaced from the arm member pivot axis;
 (D) a first fixed stop member disposed in the arcuate path of said hook portion with said seat back in its said first position and configured to be lockingly engaged by said hook portion to latch said seat back in its said first position; and
 (E) a second fixed stop member disposed in the arcuate path of said hook portion with said seat back in its said second position and configured to be lockingly engaged by said hook portion to latch said seat back in its said second position.

2. A folding seat according to claim 1 wherein
 (D) said hook portion is defined as a slot in said arm member extending in a direction generally transverse of said arm member and normal to the arm member axis and opening at one side edge of the arm member; and
 (E) said first and second stop members respectively comprise fixed first and second pins extending generally parallel to the arm member axis and adapted to be selectively received within said slot.

3. A folding seat assembly according to claim 2 and further including:
 (F) spring means continuously biasing said arm member for rotation about its axis in one direction in which said one side edge is the leading edge; and
 (G) manually operable means for rotating said arm member about its axis in the opposite direction against the bias of said spring means.

4. A folding seat according to claim 3 wherein
 (A) said arm member is pivotally mounted to said seat back intermediate its ends;
 (B) said slot is formed in one end of said arm member; and
 (C) said manually operable means comprises
  (1) an eccentric pivotally mounted on said seat back and engaging the other end of said arm member, whereby said arm member is rotated in response to rotation of said eccentric, and
  (2) linkage means, including a handle remote from said arm member and said eccentric, operative in response to movement of said handle to rotate said eccentric.

5. A folding seat assembly according to claim 1 and further including
 (H) means operative during movement of said seat back from one of its said positions towards the other of its said positions to rotate said arm member about its axis in said one direction, whereby to condition the arm member for receipt of the related stop member upon arrival at its said other position.

6. A folding seat assembly according to claim 1 and further including
 (H) means operative during movement of said seat back from one of its said positions toward the other of its said positions to rotate said arm member about its axis in said opposite direction, whereby to condition the arm member for receipt of the related stop member upon arrival at its said other position.

7. A folding seat assembly according to claim 1 and further including
 (H) means operative
  (1) during movement of said seat seat back from said first position to said second position to rotate said arm member about its axis in said one direction, whereby to condition said arm member for receipt of said second stop member, and
  (2) during movement of said seat back from said second position to said first position to rotate said arm member about its axis in said opposite direction, whereby to condition said arm member for receipt of said first stop member.

8. A folding seat assembly according to claim 7 wherein
 (I) said operative means includes
  (1) a fixed elongated guide surface lying in a plane generaly parallel with said axes and
  (2) a guide pin projecting laterally from said arm member and adapted to slidably engage said guide surface during movement of said seat back between its said positions.

References Cited

UNITED STATES PATENTS

| | | | |
|---|---|---|---|
| 2,732,003 | 1/1956 | Williams | 297—379 |
| 2,752,988 | 7/1956 | Marvin | 297—379 |
| 2,828,806 | 4/1958 | Saffer | 297—379 |
| 2,833,336 | 5/1958 | McGregor | 297—379 X |
| 2,837,794 | 2/1959 | Leslie | 297—379 |
| 3,185,525 | 5/1965 | Welsh | 297—367 |
| 3,262,737 | 7/1966 | Martens | 297—379 |

DAVID J. WILLIAMOWSKY, *Primary Examiner.*

G. O. FINCH, *Assistant Examiner.*